United States Patent
Vendrow et al.

(10) Patent No.: US 9,843,606 B1
(45) Date of Patent: Dec. 12, 2017

(54) SYSTEMS AND METHODS FOR CONFERENCING

(71) Applicant: RingCentral, Inc., Belmont, CA (US)

(72) Inventors: Vlad Vendrow, Reno, NV (US); Aleksei Petrov, Redwood City, CA (US); Dmitriy Solovey, San Jose, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/406,640

(22) Filed: Jan. 13, 2017

(51) Int. Cl.
*H04L 29/06* (2006.01)
*H04L 12/24* (2006.01)

(52) U.S. Cl.
CPC ......... *H04L 65/1069* (2013.01); *H04L 41/08* (2013.01); *H04L 65/1003* (2013.01); *H04L 65/1013* (2013.01); *H04L 65/403* (2013.01); *H04L 65/608* (2013.01)

(58) Field of Classification Search
None
See application file for complete search history.

(56) References Cited

U.S. PATENT DOCUMENTS

| | | | | |
|---|---|---|---|---|
| 9,197,701 | B1* | 11/2015 | Petrov | H04L 65/1066 |
| 2012/0128322 | A1* | 5/2012 | Shaffer | H04N 9/8205 |
| | | | | 386/241 |
| 2014/0040360 | A1* | 2/2014 | Privat | G06F 3/1423 |
| | | | | 709/204 |
| 2016/0165184 | A1* | 6/2016 | Aaron | H04L 12/1822 |
| | | | | 348/14.08 |

* cited by examiner

*Primary Examiner* — Angela Nguyen
(74) *Attorney, Agent, or Firm* — Finnegan, Henderson, Farabow, Garrett & Dunner LLP

(57) ABSTRACT

Systems and methods are provided for establishing a video conference session. The systems and methods may include receiving, from a first conference client device, a request to establish a conference session with a second conference client device; determining a first media router for forwarding, to the second conference client device, a media data stream with predetermined attributes of a plurality of first media data streams generated by the first conference client device; determining a second media router for forwarding, to the first conference client, a media data stream with predetermined media attributes of a plurality of second media data streams generated by the second conference client device; and transmitting, to the first conference client device, a first address associated with the first media router and a second address associated with the second media router.

20 Claims, 11 Drawing Sheets

SYSTEMS AND METHODS FOR CONFERENCING

FIELD

The present disclosure relates to the field of multimedia communications, and more specifically, to a conferencing system.

BACKGROUND

A multimedia conference, such as a video conference, typically includes the routing of voice and video data, over a network between participant devices. The perceived quality of the conference, as well as the network resource usage, can be affected by the network path chosen for routing the multimedia data. The conference media data can also be recorded for future retrieval.

SUMMARY

The present disclosure arises from the realization that real-time delivery of multimedia data can be adversely affected by various conditions along a network path through which the data is routed, such as network congestion, and performance and capacity of various network components along the network path. Therefore, it is advantageous to shorten the network path whenever possible. However, traditional network infrastructure for conferencing typically provides a single media router located between all participants for routing the media data. As a result, even media traffic exchanged between closely-located participants has to be routed through a long network path, which can lead to degraded conference quality as well as inefficient usage of network resources.

Moreover, traditional network infrastructure for conferencing typically provides recording of the conference based on the media data captured at the single media router. Some of the captured media data may have already experienced huge loss by the time they are captured. As a result, the quality of the recording can also be degraded as well.

A method of establishing a video conference session is disclosed. Consistent with embodiments disclosed herein, the method comprises receiving, from a first conference client device, a request to establish a conference session with a second conference client device. The method also comprises determining a first media router for forwarding, to the second conference client device, a media data stream with predetermined attributes of a plurality of first media data streams generated by the first conference client device. The method also comprises determining a second media router for forwarding, to the first conference client, a media data stream with predetermined media attributes of a plurality of second media data streams generated by the second conference client device. The method further comprises transmitting, to the first conference client device, a first address associated with the first media router and a second address associated with the second media router, to enable the first conference client device to transmit the plurality of first media data streams to the first media router and to receive the media data stream with predetermined media attributes of the plurality of second media data streams from the second media router.

Consistent with another disclosed embodiment, a system for establishing a video conference session is provided. The system comprises one or more memories having stored thereon computer-executable instructions, and one or more hardware processors configured to execute the stored instructions. When the stored instructions are executed, the one or more hardware processors can receive, from a first conference client device, a request to establish a conference session with a second conference client device. The one or more hardware processors can also determine a first media router for forwarding, to the second conference client device, a media data stream with predetermined attributes of a plurality of first media data streams generated by the first conference client device. The one or more hardware processors can also determine a second media router for forwarding, to the first conference client, a media data stream with predetermined media attributes of a plurality of second media data streams generated by the second conference client device. The one or more hardware processors can also transmit, to the first conference client device, a first address associated with the first media router and a second address associated with the second media router, to enable the first conference client device to transmit the plurality of first media data streams to the first media router and to receive the media data stream with predetermined media attributes of the plurality of second media data streams from the second media router.

Consistent with other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

The disclosed embodiments concern managing network resources for conferences. With the disclosed embodiments, one or more user devices can transmit media data to a first media router and receive media data from a second media router. The one or more user devices may also receive media data from the first media router as well. User devices within a predetermined geographical region can exchange media data through the first media router, which can be located close to those participant devices. Such arrangements may create a distributed system for routing the media data, which allows more flexible assignments of media router resources for routing and forwarding the media data. As a result, the routing paths for the media data can be shortened, and a number of media routers along the routing paths can also be reduced. This leads to more efficient usage of network resources for delivering the media data, and can also improve the perceived quality of the conference.

Moreover, the distributed system for routing media data also allows the recording of a conference using media data captured by media routers that are close to the sources, and can capture the media data with less loss. As a result, the quality of the recording can improve as well.

Other features and advantages of the present embodiments are discussed in further detail below with respect to the figures.

Figure 1A:
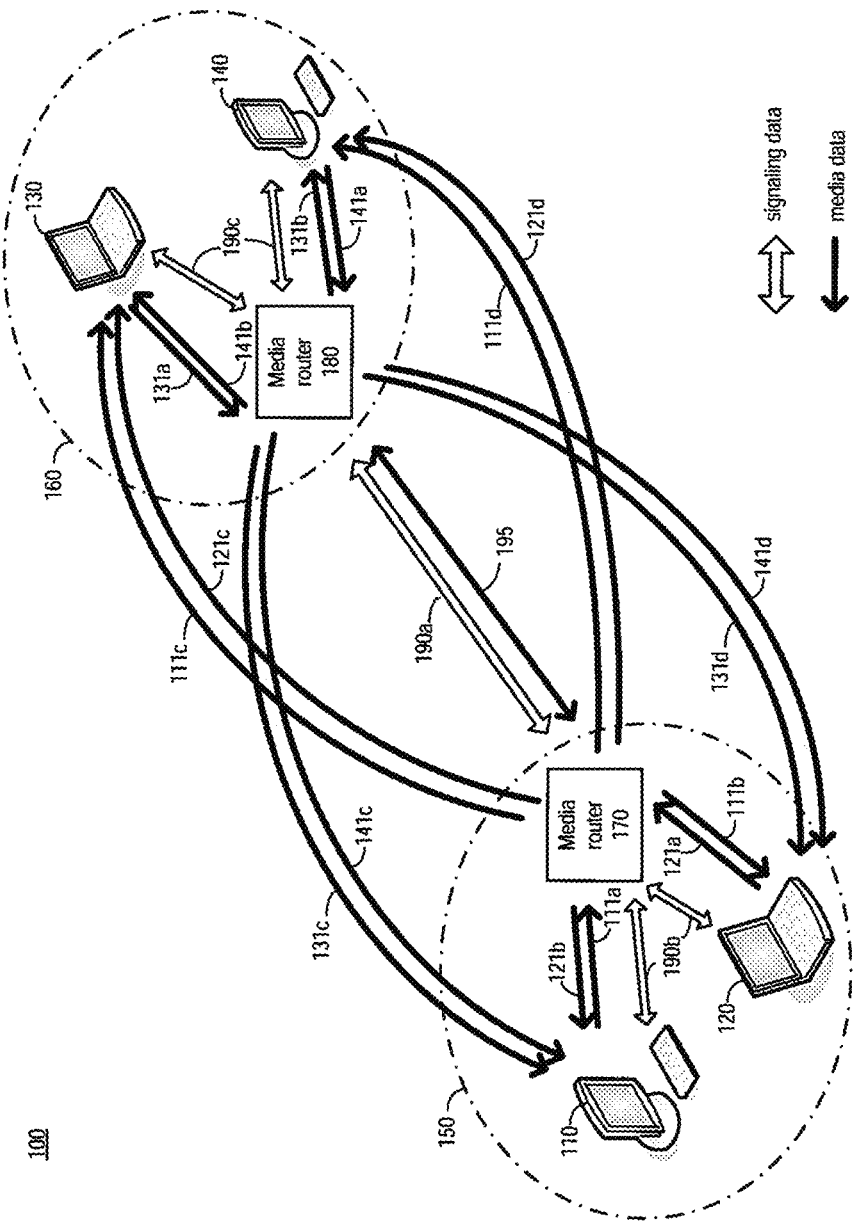
FIGS. 1A-1B are diagrams of an example of a system environment in which embodiments of the present disclosure can be used for providing conferencing service.

FIG. 1A is a diagram of an example of a system environment in which embodiments of the present disclosure can be used for providing conferencing service. As shown in FIG. 1A, system environment 100 includes four example participant devices including user devices 110, 120, 130, and 140. User devices 110 and 120 may be located in a predetermined locale 150. User devices 130 and 140 may be located in another predetermined locale 160. The locales can be, for example, predetermined geographical regions (e.g., a continent, a country, a state, a city, a district, etc.), at certain locations of a building, etc.

It should be noted that the term "user" is being used in the interest of brevity and may refer to any of a variety of entities that may be associated with a subscriber account such as, for example, a person, an organization, an organizational role within an organization, a group within an organization, etc. The user devices can include a variety of devices, such as mobile phones, landline phones, Voice over IP (VoIP) phones, gateways, audio and/or video conferencing devices, gaming consoles, personal computers, laptops, smartwatches, or tablets. The user devices may be installed with software that support conferencing, such as web browsers, web-based real time communications (WebRTC) client application, a mobile app, etc.

System environment 100 further includes media routers 170 and 180. Each of media routers 170 and 180 is coupled to the user devices 110, 120, 130, and 140 via one or more networks such as a local area network, a wireless network, the Internet, etc., which is not shown in FIG. 1. Media routers 170 and 180 can transmit and receive media packets to user devices 110, 120, 130, and 140 via the one or more networks using protocols such as, for example, Real-Time Transport Protocol (RTP). Media routers 170 and 180 can also be coupled with (or can be a part of) a media server configured to perform further processing of the received media data streams, which may include, for example, mixing multiple data streams received from different user devices into a single data stream, transcoding and/or changing the frame rate of the media data to reduce network load, etc.

Each of media routers 170 and 180 enables exchange of media data packets between the user devices within the same locale. For example, as shown in FIG. 1, media router 170 can be associated with (and/or located in) locale 150 in which user devices 110 and 120 are located. User devices 110 and 120 can be configured to only transmit media data (e.g., media data 111a and 121a) to media router 170, or any media router within locale 150. Media router 170 can also transmit media data 111b (which is a copy of media data 111a) to user device 120, and media data 121b (which is a copy of media data 121a) to user device 110, to allow user devices 110 and 120 to exchange media data. Likewise, user devices 130 and 140 can be configured to only transmit media data (e.g., media data 131a and 141a) to media router 180, or any media router within locale 160. Media router 180 can also transmit media data 131b (which is a copy of media data 131a) to user device 140, and media data 141b (which is a copy of media data 141a) to user device 130, to allow user devices 130 and 140 to exchange media data as well.

Media routers 170 and 180 can also transmit media data packets between user devices of different locales. For example, after receiving media data 111a from user device 110 and media data 121a from user device 120, media router 170 may transmit media data 111c and 111d (which are copies of media data 111a) and media data 121c and 121d (which are copies of media data 121a) to, respectively, user devices 130 and 140. Moreover, after receiving media data 131a from user device 130 and media data 141a from user device 140, media router 180 may also transmit media data 131c and 131d (which are copies of media data 131a) and media data 141c and 141d (which are copies of media data 141a) to, respectively, user devices 110 and 120.

Consistent with embodiments of the present disclosure, media data traffic between user devices of the same locale (e.g., media data 111a, 111b, 121a, and 121b) can occur at a media router within that locale (e.g., media router 170). Therefore, the quality of media communication between those user devices can be improved. Moreover, by separating those media traffics, which occur within a locale, from media traffics between user devices of different locales (e.g., media data 131c, 131d, 141c, and 141d), network resources can be preserved for media traffics that truly require long-distance routing. Therefore, the network resource usage can become more efficient as well.

Figure 1B:
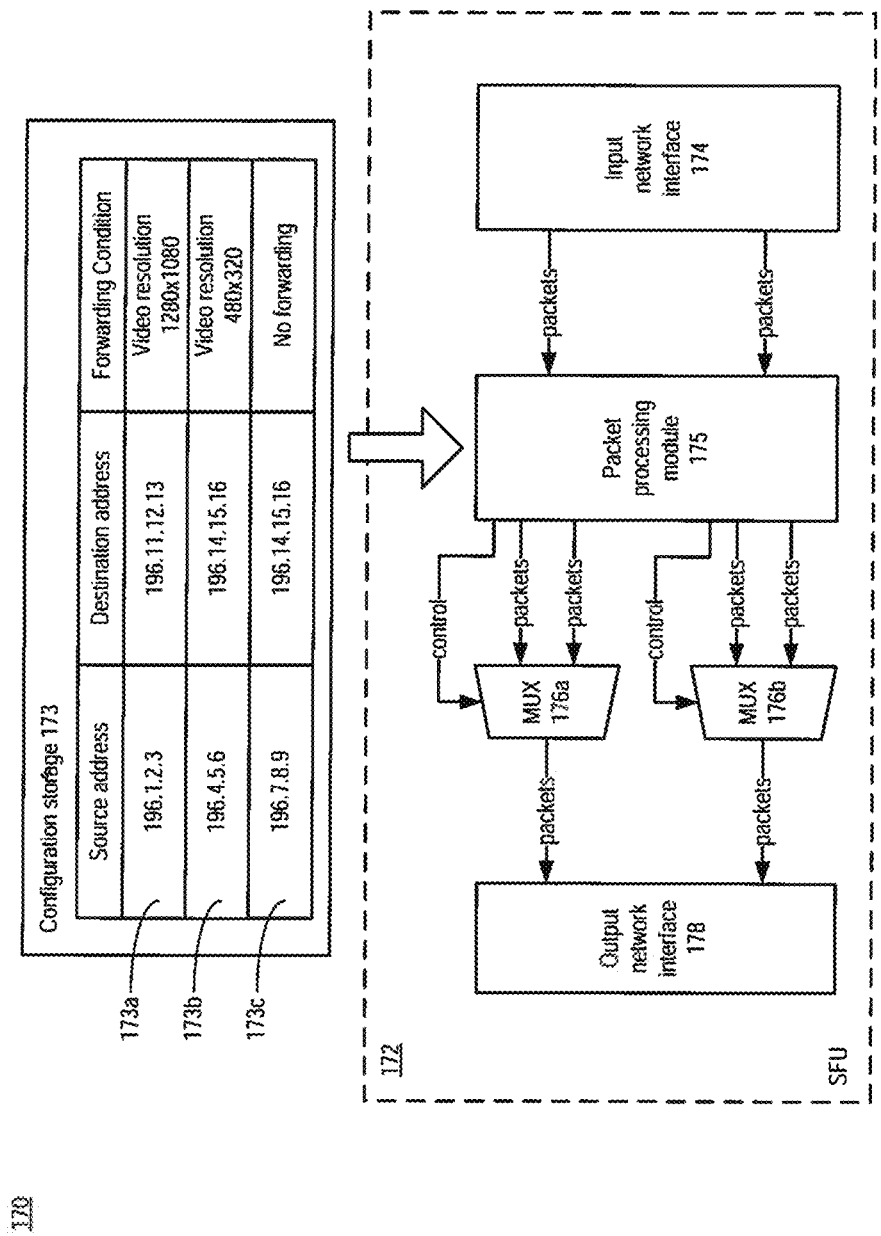

In some embodiments, media routers 170 and 180 can include a selective forwarding unit (SFU) which can receive multiple media data streams from different user devices and of different qualities (e.g., different video resolution and/or audio encoding rates), and can selectively transmit the received media data streams to one or more predetermined user devices. Reference is now made to FIG. 1B, which illustrates an example of media router 170, consistent with the disclosed embodiments. As shown in FIG. 1B, media router 170 includes a selective forwarding unit 172 and a configuration storage 173. Selective forwarding unit 172 includes an input network interface 174, a packet processing module 175, a set of multiplexers (MUX) 176, and an output network interface 178. Some of these modules, such as packet processing module 175, can be software modules.

Packet processing module 175 may receive media packets with input network interface 174, and selectively forward some of the received media packets to output interface 178 based on a set of forwarding conditions stored in configuration storage 173. The received media packets can be associated with multiple media data streams from different user devices. Those data streams may be targeted at different user devices as well. Based on the set of forwarding conditions stored in configuration storage 173, packet processing module 175 and multiplexers 176 can determine to forward which of the received media data streams to the target user devices. In some embodiments, each of multiplexers 176 can be assigned to a target user device, and can control which of the received media streams is to be forwarded to the target user device.

As an illustrative example, referring to FIG. 1B, configuration storage 173 stores a mapping table that specifies the forwarding conditions for media data packets associated with certain source and destination addresses. For example, table entries 173a and 173b specify that for media data associated with certain pairings of source and destination addresses, only those data with the specified video resolution will be forwarded. Also, table entry 173c also specifies that media data associated with a particular source and destination addresses pairings will not be forwarded at all. The source and destination addresses may include, for example, Internet Protocol (IP) addresses, media access control (MAC) addresses, port numbers, etc., that are associated with user devices being operated to participate in a conference session.

After receiving data packets from input network interface 174, packet processing module 175 can extract the source and destination addresses from the data packets. There are also different ways by which processing module 175 can determine the video resolution information of the data packets. For example, packet processing module 175 can determine the video resolution information from the packet payload of RIP packets. As another example, input network interface 174 may include a number of ports for receiving data packets, and each port may be mapped to a specific video resolution. As to be discussed in detail below, through signaling data exchange between media router 170 and the user devices, media router 170 may provide mapping information that indicates the mapping between ports and video resolutions to the user devices. The user devices can then transmit data streams of multiple video resolutions to the associated ports according to the mapping information. Packet processing module 175 can then determine the video resolution of a stream of data packet based on the port at which the stream is received.

Packet processing module 175 can then forward the packets to the multiplexers 176 assigned to the destination participant devices associated with the destination addresses, and control the multiplexers to forward packets that satisfy the forwarding conditions to output network interface 178, and discard packets that do not satisfy the forwarding conditions. Output network interface 178 releases the packets into the network for the target user devices.

The forwarding conditions can include other conditions as well, such as forwarding a video stream that is associated with an audio stream with a predetermined audio level. As an illustrative example, a participant to a conference may like to selectively receive videos of the loudest speaker at the highest possible resolutions. The participant may transmit, via a user device, configuration information to media router 170 to perform the aforementioned selection. Media router 170 can then set the forwarding condition accordingly. In a case where the speaker's user device transmits audio level information together with the audio data that accompanies the video stream, packet processing module 175 can determine the audio levels for each video stream it receives, and pick the video stream associated with the highest audio level for forwarding. In a case where a speaker user device transmits multiple video streams (all associated with the same audio level), packet processing module 175 can first identify the video streams associated with the highest audio level, and then select, among the identified video streams, the video stream of the highest available resolution (e.g., based on the port at which the video stream is received, RTP payload, etc.) for forwarding.

In some embodiments, the forwarding conditions in configuration storage 173 can be set based on signaling data 190a exchanged between media routers 170 and 180, signaling data 190b exchanged between user devices 110/120 and media router 170, and signaling data 190c exchanged between user devices 130/140 and media router 180. The signaling data can include information for establishing a conference session such as, for example, access control information (e.g., which participant is allowed to join the conference, and at what time), identifiers of the user devices (e.g., IP address, MAC addresses, etc.) and their configurations, etc. As an illustrative example, based on a display screen size of a target user device, or a request from that device when establishing the conference session, the forwarding conditions can be set so that the target user device only receives video data streams of a certain video resolution. The forwarding conditions can also be set dynamically during the conference session. For example, the target user device may transmit an instruction to stop viewing one of the participants' presentations. The forwarding conditions can be set to stop forwarding video data from a particular user device to the target user device, similar to as illustrated in table entry 173c. The signaling data can be transmitted using, for example, WebRTC protocol, Session Initiation Protocol (SIP), Session Description Protocol (SDP), etc.

In some embodiments, media routers 170 and 180 may act as a relay for media streams. For example, media router 180 can selectively forward at least some of the received media data (e.g., media data 131a and 141a from user devices 130 and 140) to media router 170, which can then forward the media data to user devices 110 and/or 120. The selective forwarding by media router 180 can be configured based on signaling data 190a as well. For example, media router 180 may receive audio level information associated with media data 131a and 141a, and transmit the audio level information to media router 170. Media router 170 can select, among media data 131a and 141a, the media data associated with the highest audio level for relaying from media router 180, and then transmit the selection information to media router 180. The selection can be based on, for example, configuration information from user devices 110 and 120 transmitted as a part of signaling data 190b. As another example, media router 170 can determine a maximum number of video streams requested by the user devices 110 and 120 (e.g., based on signaling data 190b). If this maximum number exceeds the threshold maximum number of video streams media router 170 can forward, media router 170 instructs media router 180 to stop relaying some of the media data targeted at user devices 110 and 120 to media router 170, and to forward those media data directly to user device 110 and 120.

Figure 2:
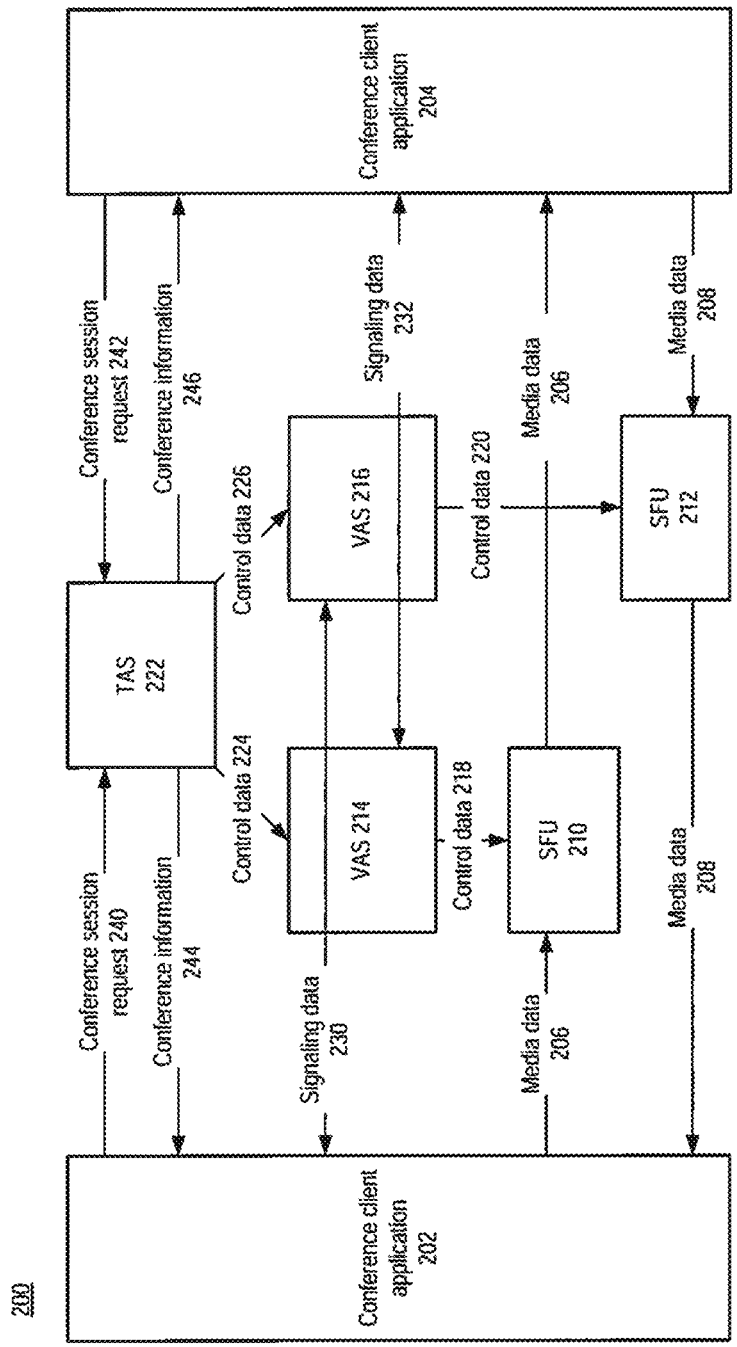
FIG. 2 is a block diagram of an example of a system for providing conferencing service, consistent with the disclosed embodiments.

FIG. 2 is a block diagram of an example of a system for providing conferencing service, consistent with the disclosed embodiments. As shown in FIG. 2, system 200 comprises conference client applications 202 and 204. Conference client applications 202 and 204 can be installed on, respectively, user devices 110 and 130 of FIG. 1. The conference client applications 202 and 204 may control various audio and video input and output interfaces of the user devices (e.g., camera, display, audio recorder, speaker, etc.) to enable real-time conferencing between users. For example, conference client application 202 can be operated by a first user to capture her video images and audio signals, and transmit them as media data 206 to conference client application 204, which can then output the received video images and audio data. Conference client application 202 may also receive, as a part of media data 208, video images and audio signals of the second user from conference client application 204, and play the video images and audio signals through the output interfaces (e.g., display, speaker, etc.) of user device 110. Conference client applications 202 and 204 may include, for example, a web browser, a mobile app, a WebRTC application, etc.

System 200 further includes selective forwarding units 210 and 212. Selective forwarding unit 210 is configured to transmit media data 206 from conference client application 202 to conference client application 204. Selective forwarding unit 212 is configured to transmit media data 206 from conference client application 204 to conference client application 202. The operations of selective forwarding units 210 and 212 can be controlled by, respectively, video application servers (VAS) 214 and 216 via control data 218 and 220. The control data 218 and 220 may include, for example, instructions to selective forwarding units 210 and 212 to reserve processing resources for the conference session, the MAC and/or IP addresses of participant user devices, etc. In some embodiments, selective forwarding unit 210 can be collocated with video application server 214 in a data center, and selective forwarding unit 212 can be collocated with video application server 216 in another data center. Video application servers 214 and 216 can be controlled by a telco application server (TAS) 222 based on, respectively, control data 224 and 226, the details of which are to be discussed below.

In some embodiments, video application servers 214 and 216 can monitor and manage the network resources for establishing a conference session. In some examples, video application servers 214 and 216 monitor and rely upon collected data, such as live and/or historical network performance data, for improved management of network resources. For example, video application servers 214 and 216 may maintain a database (not shown in FIG. 2) to keep track of a set of bandwidth indicators associated with each of selective forwarding units under control. The bandwidth indicators may include, for example, packet loss rate, packet delay, queue depth, processor utilization rate, etc. Video application servers 214 and 216 may also store, in the database, capability, or capacity information of network resources (including the selective forwarding units) as well. The capability information may include, for example, codec requirement, video and frame rate requirement, etc. Upon receiving a request for network resources for a conference session, which may include certain performance metrics and capability requirements, video application servers 214 and 216 may refer to the bandwidth indicators and capability information stored in the database to select a selective forwarding unit, as well as other media processing resources, that satisfy the requirements.

Video application servers 214 and 216 may also configure the selective forwarding units based on signaling data 230 and 232 received from respectively conference client applications 202 and 204. As an illustrative example, conference client application 204 may include multiple video data streams in media data 208 transmitted to selective forwarding unit 212. The packets of each video data stream may include an identifier in the payload that indicates a particular video resolution, as well as source and destination addresses in the header. Through signaling data 230, conference client applications 202 may inform video application server 216 about a resolution of video image to be received from conference client application 204.

Based on this information, video application servers 216 can control selective forwarding unit 212 to capture data packets that are originated from client application 204 (based on source address) and targeted at client application 202 (based on destination address), and with the required resolution. Selective forwarding unit 212 can then transmit the captured data packets to conference client application 202.

As another illustrative example, conference client application 202 may also inform video application servers 216 to stop selective forwarding unit 212 from transmitting video data stream and/or audio data stream from conference client application 204. Selective forwarding unit 212 may then block all the packets that are originated from conference client application 204 and targeted at conference client application 202. Conference client application 204 may also control the operation of selective forwarding unit 210 through signaling data 232 in similar fashions.

Although not shown in FIG. 2, conference client application 202 may also transmit signaling data 230 to video application server 214, which can then forward the signaling data to video application server 216. Conference client application 204 may also transmit signaling data 232 to video application server 216, which can then forward the signaling data to video application server 214.

Although FIG. 2 illustrates that conference client applications transmit signaling data to the video application servers, the conference client applications may also transmit the signaling data (or other control data) directly to the selective forwarding units to control their operations. As an illustrative example, conference client application 202 may transmit RTP control protocol packets which can provide an indication of quality of media communication at conference client application 202. Based on the quality indication, selective forwarding unit 212 can also adaptively select a video stream of a predetermined resolution for transmission to conference client application 202.

Telco application server 222, in conjunction with video application servers 214 and 216, manages and allocates the network resources for establishing a conference session, and provides information about the allocated resources to conference client applications 202 and 204 to establish the conference session. Telco application server 222 may receive, for example, conference session request 240 from conference client application 202, and conference session request 242 from conference client application 204. After receiving requests from conference client applications 202 and 204 to establish a conference session between them, telco application server 222 may determine the video application servers for establishing the conference session. In the scenario illustrated in FIG. 2, telco application server 222 may determine to use video application servers 214 and 216 to provide the resources for establishing the conference session.

Telco application server 222 may determine the video application servers for establishing the conference session based on various factors. One factor can be the locales of the user devices on which the requesting conference client applications operate. As discussed above, in order to minimize network resources for transmission of the media data of the conference among the participant devices, it may be advantageous to provide a media router (e.g., selective forwarding unit) that is within the locale of some of the participant devices, to allow those participant devices to exchange media data within that locale. Therefore, telco application server 222 may determine the geographical locations of the user devices on which the requesting conference client applications operate and, based on the geographical locations, determine a set of selective forwarding units within a certain distance from those geographical locations and are managed by a particular video application server.

As an illustrative example, telco application server 222 may maintain a database that stores a mapping table that associates geographical locations with conference client applications, and a mapping table that associates the video application servers with the selective forwarding units managed by the video application servers and with the geographical locations of the selective forwarding units. Based on these mapping tables, telco application server 222 may determine a video application server that manages selective forwarding units that are at vicinity to the requesting conference client applications.

Telco application server 222 may also determine the video application servers for establishing the conference session based on other factors. For example, telco application server 222 may determine specific network resources requested for the conference session, and then determine a video application server that manages the requested network resources. As an illustrative example, the conference session may have certain media quality requirements (e.g., a certain resolution and frame rate for the video, a certain encoding rate of the audio, etc.), certain media processing requirements (e.g., to use a specific codec for transcoding the video), etc. Telco application server 222 may then determine a video application server that manages media routers and processing servers that can satisfy the media quality and processing requirements. In some embodiments, telco application server 222 may store the network resources capabilities information in the aforementioned database, and pick a video application server based on the stored information.

After determining the video application servers (e.g., video application servers 214 and 216), telco application server 222 can transmit control data 224 and 226 to the servers to request for network resources for the conference session. Video application servers 214 and 216 can determine the selective forwarding units (e.g., selective forwarding units 210 and 212) based on the requested capability and performance metrics, as discussed above. The request may also include other configuration information, such as preconfigured resolution information for displaying the video data streams, which can be dynamically changed later by signaling data 230 and 232 during the conference session.

Video application servers 214 and 216 determine connection information that allows the conference client applications (e.g., conference client applications 202 and 204) to connect with forwarding unit 210 and 212, and provide the connection information to telco application server 222, which can in turn forward the connection information to the conference client applications. Such information may include, for example, IP addresses, MAC addresses, port numbers, etc., associated with the forwarding units. Telco application server 222 may forward the addresses of both of selective forwarding units 210 and 212 in conference information 244 and 246 back to, respectively, conference client applications 202 and 204. In conference information 244 for conference client application 202, telco application server 222 may indicate that a first address (IP, MAC, etc.) associated with selective forwarding unit 210 is for transmission and reception of media data, and that a second address associated with selective forwarding unit 212 is for reception of media data only. Moreover, in conference information 246 for conference client application 204, telco application server 222 may indicate that the first address associated with selective forwarding unit 210 is for reception of media data, and that the second address associated with selective forwarding unit 212 is for transmission and reception of media data. In some embodiments, conference information 244 and 246 may also include other information, such as credentials for joining the conference sessions.

After receiving conference information 244 and 246 from telco application server 222, conference client applications 202 and 204 can transmit, respectively, signaling data 230 and 232 to video application server 216 (and/or to video application server 214) to establish connections with selective forwarding units 210 and 212, and to configure the transmission of data streams by selective forwarding units 210 and 212, as discussed above.

Figure 3A:
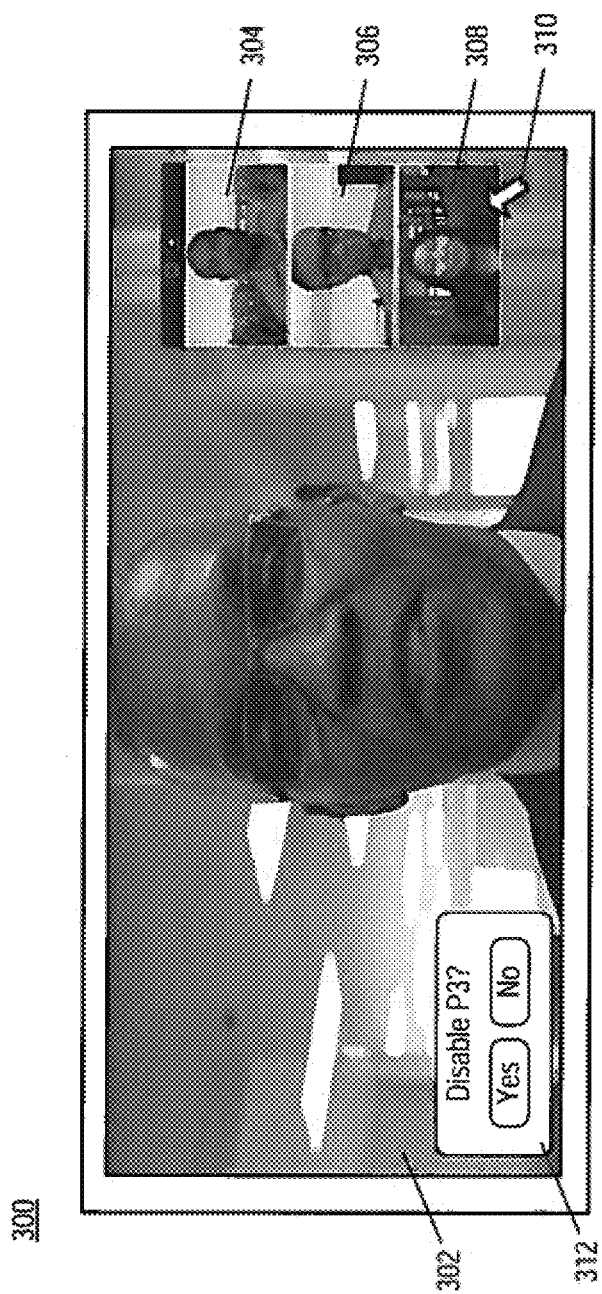
FIGS. 3A-3B are diagrams of an example of a conference client interface consistent with embodiments of the present disclosure.
Figure 3B:
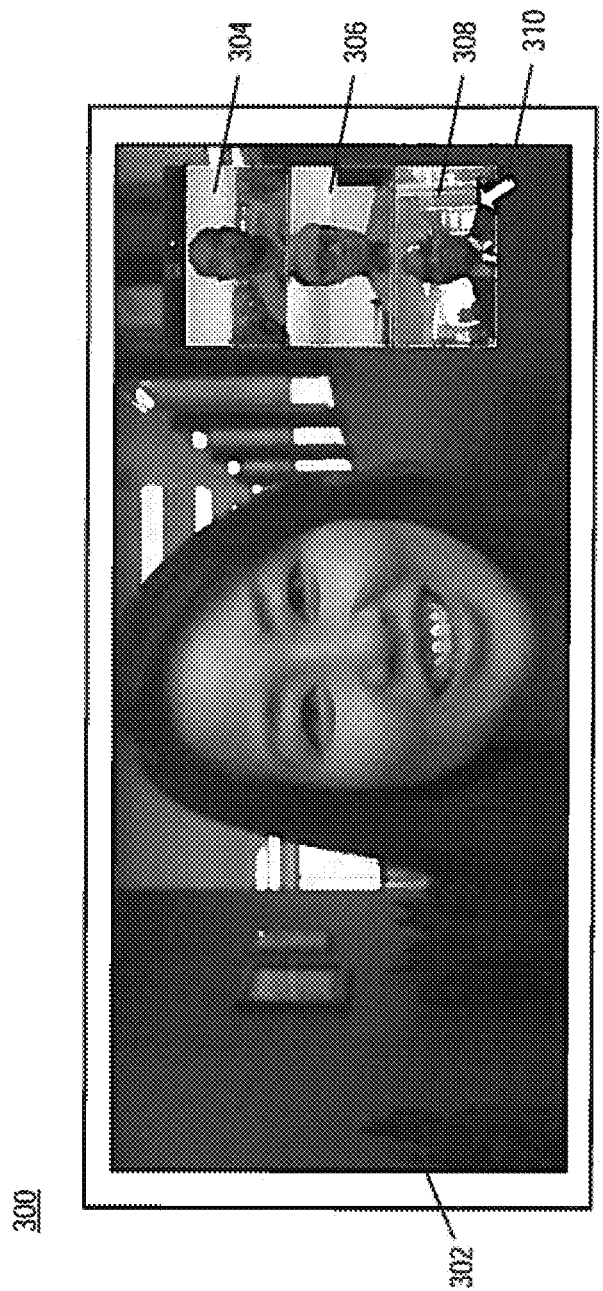

Reference is now made to FIGs. 3A-3B, which illustrates an example of a conference client interface consistent with embodiments of the present disclosure. Conference client interface 300 can be provided by, for example, conference client applications 202 or 204 and can be displayed on a screen of a user device (e.g., user devices 110, 120, etc.). As shown in FIG. 3A, conference client interface 300 displays live video images of participants of a conference. Conference client interface 300 may include a dominant window 302 for displaying a video image of one of the participants, as well as thumbnail windows 304, 306, and 308 for displaying video images of other participants.

Each of dominant window 302 and thumbnail windows 304, 306, and 308 may correspond to a video stream transmitted or captured from a participant user device of FIG. 1. As an illustrative example, conference client interface 300 may be displayed on the display screen of user device 110, which also captures the video images displayed in dominant window 302. Thumbnail window 304 may display video images corresponding to media data 121*b* transmitted from user device 120 through media router 170. Thumbnail windows 306 and 308 may display video images corresponding to, respectively, media data 131*c* and media data 141*c* from media router 180. The thumbnail windows also can be positioned at any display position in the screen based on a user input (e.g., by detecting a dragging action of cursor 310), or can be preconfigured. The setting of the positions of the thumbnail windows can also be based on display configuration data included in signaling data 230 and 232 in the conference session requests 240 and 242, etc. In some embodiments, conference client application 202 (and 204) maintains a frame buffer for rendering content on the display screen of a user device, and can set the content of the frame buffer by overlaying the video contents that correspond to the thumbnail windows on top of the video contents that correspond to the dominant window at preset positions.

As shown in FIG. 3A, the dominant window and the thumbnail windows may correspond to different display resolutions. For example, the dominant window may correspond to high-definition television (HDTV) resolution such as 1920×1080 pixels, whereas the thumbnail windows may correspond to lower resolutions such as, for example, 480× 320 pixels. Conference client application 202 (and/or 204) may preconfigure the display resolutions for each of the dominant and thumbnail windows, and control (e.g., via signaling data 230 and 232) selective forwarding units 210 and 212 to selectively transmit video streams corresponding to the preconfigured resolutions. Conference client application 202 may also assign each of the dominant and thumbnail windows to the video streams of different participant devices, and then control the selective forwarding units to transmit video streams according to the assignment.

As an illustrative example, selective forwarding unit 212 may receive multiple video data streams of different display resolutions from conference client application 204. Each video data streams include video resolution information (e.g., in the payload, in the metadata, etc.) and source information (e.g., IP address). Conference client application 202 may maintain a mapping table that maps each of dominant window 302 and thumbnail windows 304, 306, and 308 to the source IP address and the video resolution. Conference client application 202 may also use signaling data 230 to transmit the mapping information to selective forwarding unit 212, which can then selectively forward video streams of the requested resolutions to conference client application 202.

In some embodiments, the dominant and thumbnail windows may be configured to dynamically switch between video streams from different participants, after receiving an indication from the operator. For example, as shown in FIG. 3A, each of the thumbnail windows 304, 306, and 308 can be selected with a cursor 310. After detecting a selection of thumbnail window 308, conference client application 202 may assign a different source IP address and video resolution to dominant window 302, so that dominant window 302 displays video data from a different participant. Conference client application 202 can also update signaling data 230 to transmit the updated mapping information to selective forwarding unit 212. As a result, as shown in FIG. 3B, the video contents of dominant window 302 and thumbnail window 308 are swapped compared with FIG. 3A.

Moreover, the thumbnail windows can also be turned off to stop receiving video data from a participant device. For example, based on a certain user input (e.g., a right-click on a thumbnail window), a pop-up window 312 can appear and ask whether the selected thumbnail window is to be disabled. In some embodiments, conference client interface 300 can also detect a scrolling action to move thumbnail window 308 out of the screen. If conference client application 202 detects, via conference client interface 300, that a thumbnail window (e.g., thumbnail window 308) is to be disabled (e.g., by detecting a selection in pop-up window 312, the scrolling action, etc.), conference client application 202 can control, over signaling data 230, selective forwarding unit 212 to stop transmitting media data from the source participant device for thumbnail window 308, and thumbnail window 308 can be minimized. In some embodiments, a user can also configure conference client interface 300 to set a number of participants to be viewed in the interface. Conference client application 202 can then determine to turn on or off the thumbnail windows, and to enable/disable the transmission of the video data associated with these thumbnail windows by selective forwarding unit 212, based on the number of participants setting.

Figure 4:
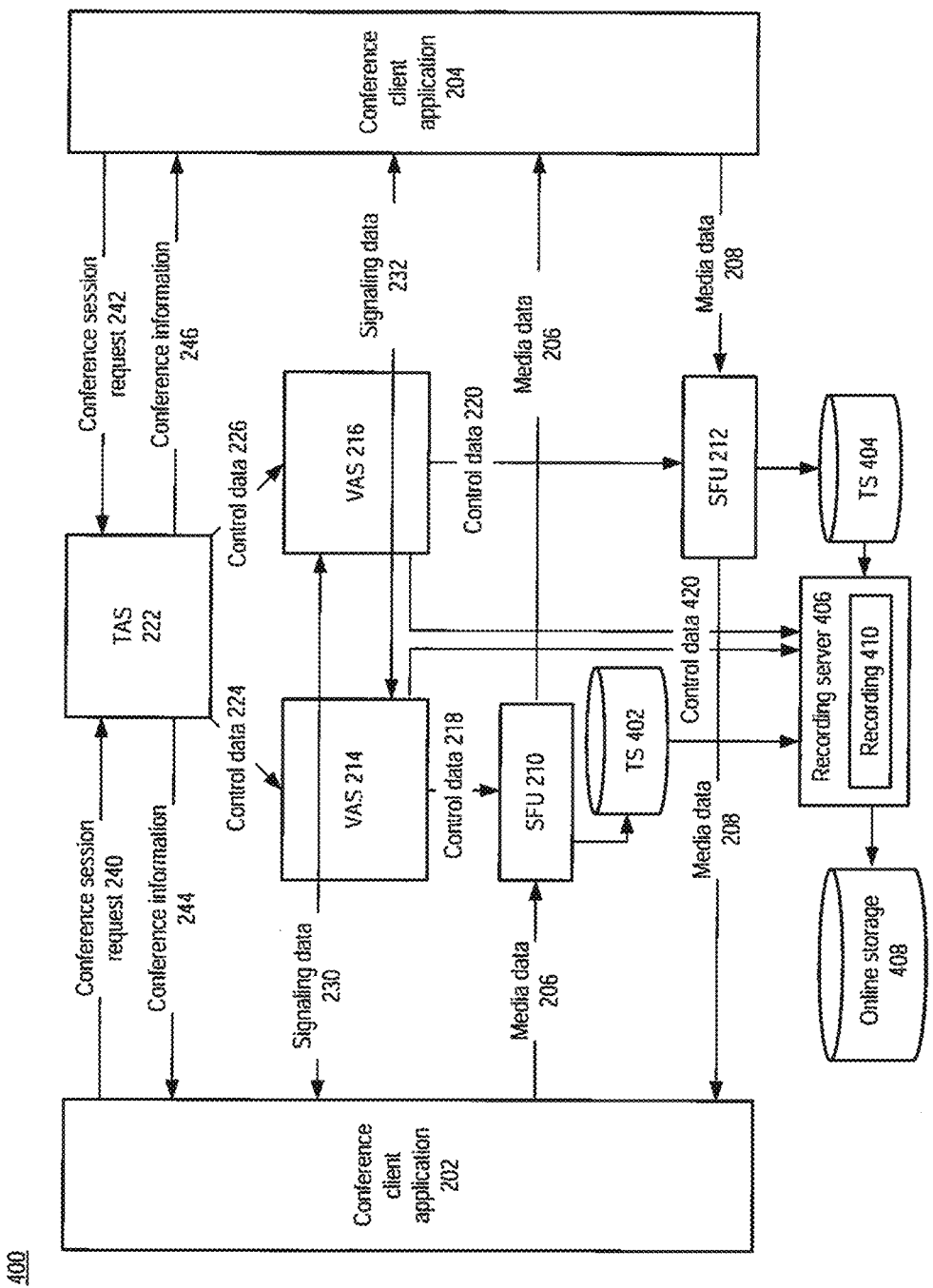
FIG. 4 is a block diagram of an example of a system for providing recorded conferencing service consistent with embodiments of the present disclosure.

Reference is now made to FIG. 4, which is a block diagram of an example of a system for providing recorded conferencing service, consistent with disclosed embodiments. As shown in FIG. 4, system 400 may include all the components of system 200. In addition, system 400 optionally includes temporary storages (TS) 402 and 404, and also includes recording server 406, and an online storage 408. As used herein, the term "temporary storage" is used to distinguish other storages (e.g., online storage 408). The information stored may not be temporary in some implementations, and in other implementations any storage capable of storing the information may be used.

Temporary storages 402 and 404 can provide temporary storage spaces for the media data received and/or transmitted by, respectively, selective forwarding units 210 and 212. In some embodiments, temporary storages can store media data received and processed by the selective forwarding units, which may include video data streams of different resolutions transmitted by the source participant devices. In some embodiments, the temporary storage storages can also store media data transmitted by the selective forwarding units according to the forwarding conditions stored in configuration storage 173. For example, temporary storage 402 and 404 can be associated with, respectively, selective forwarding units 210 and 212. The selective forwarding units can create copies of the data packets received at input network interface 174, at multiplexers 176, or at output network interface 178, and transmit the copies of data packets to the associated temporary storages.

Recording server 406 can create a recording 410 of a conference session based on media data stored in temporary storages 402 and 404. The recording can take in various forms. As an illustrative example, the recording can be in the form of a single video file, which includes a single media (audio and video) track. The single video track and the single audio track can be created by extracting payload of the media data packets that are transmitted through each of the selective forwarding units 210 and 212 between the participant user devices, and combining the payloads sequentially based on the associated timestamps. The video file can be in any standard, such as Moving Pictures Expert Group (MPEG-2, MPEG-4), RealMedia™, etc.

As another example, recording 410 can also be in the form of a package. In some embodiments, the package may be a container file that includes separate media tracks generated by extracting and combining payloads of media data packets generated by individual participant devices. The media tracks can also include video data of different resolutions. The media tracks can be played by a custom software player which provides an interface similar to conference client interface 300, in which the viewer can select, for example, the active participant to view and/or to listen to, the display resolution for each participant, etc. Based on the selections, the custom software player can pair the windows with the media tracks of corresponding resolutions (e.g., 1290×1080 pixels for the dominant window, 480×320 pixels for the thumbnail windows, etc.), and then play the corresponding media tracks from the package. The custom software player can also allow the user to configure the windows, such as switching the video contents between a particular thumbnail window and the dominant window, moving the thumbnail windows in the screen, etc. The package can also store other information, such as events that occur during the conference (e.g., participants joining or leaving the conference, promotion of a participant device to a leader of the conference, etc.).

In some embodiments, recording server 406 can create recording 410, and determine the type of recording (e.g., a single video file, a package, etc.) based on a user input received by conference client application 202, which can transmit an instruction to generate recording 410, as well as recording configuration information (e.g., types of recording, durations of recording, etc.) to telco application server 222. The recording instruction can be transmitted as a part of the request to establish the conference session. Telco application server 222 can forward the recording instruction to video application servers 214 and 216. The recording configuration can also be transmitted as part of signaling data 230 and 232 between the conference client applications and the video application servers before or during the conference session.

Video application servers 214 and 216 can then control, respectively, selective forwarding units 210 and 212, to perform the recording based on the recording configuration information. Video application servers 214 and 216 can also transmit control data 420 to recording server 406, to perform the recording. For example, in a case where a single video file is to be recorded, selective forwarding units 210 and 212 can be controlled to store the media data packets that have been selectively forwarded to conference client applications 202 and 204, and associated with the selected durations, at temporary storages 402 and 404. Also, in a case where a package is to be recorded, selective forwarding units 210 and 212 can be controlled to store the media data packets received from client applications 204 and 204, which can include multiple video streams of different video resolutions, at temporary storages 402 and 404.

During or at the end of the conference session, at least one of video application servers 214 and 216 can also transmit instructions to recording server 416 to acquire the recorded media data from temporary storages 402 and 404. Recording server 416 can retrieve the recorded media data from temporary storages 402 and 404 based on the information included in the instruction (e.g., network addresses of the temporary storages), and create the single video or the package as recording 410 based on the retrieved media data. Recording server 406 can store recording 410 at online storage 408. Online storage 408 may include, for example, cloud storage provided by a web services vender, such as Amazon Web Services (AWS™) S3 storage. The recording can be stored at online storage 408 and made accessible either through the custom software player (for a package) or through any other video players (for a single video file).

In some embodiments, the package can also include multiple files generated by multiple recorder servers, and a meta information file that provides links to the files. For example, video application server 214 may control selective forwarding unit 210 to transmit the received/or forwarded media data to multiple recording servers, each of which can generate a portion of the package containing the media data. The media data recorded can be the data that are forwarded to conference client application 204. The media data recorded can also be the data that are received by selective forwarding unit 210 but not forwarded to conference client application 204 (e.g., the media data is associated with a thumbnail windows which the viewer disabled by a selection in pop-up window 312, the scrolling action, etc.). Video application server 214 may also control the multiple recording servers to store the generated portions of the package at multiple locations, and maintain a metadata file that records the locations (e.g., IP and/or MAC addresses, hypertext transfer protocol (HTTP) hyperlinks, etc.) of the package portions. The meta information file can also be stored at online storage 408. The custom software player can then acquire the meta information file, and retrieve media data for playing based on the locations stored in the meta information file.

In some embodiments, system 400 can also provide recording 410 via streaming. For example, recording server 406 may split recording 410 into chunks associated with different timestamps, and provide the chunks to a viewer device sequentially according to the associated timestamps. The chunks can be delivered to the viewer device using various methods. For example, recording server 406 may establish a messaging connection (e.g., with Real-Time Messaging Protocol with the viewer device over a content delivery network, and transmit the chunks to the viewer device sequentially at pre-determined times. The transmission times can be configured to avoid stalling at the viewer device, and can be determined based on, for example, an estimation of amount of media data buffered at the viewer device, the network transmission delay, etc.

As another example, recording server 406 may generate a manifest file listing the chunks and their access locations, and transmit the manifest file to the viewer device. Recording server 406 can also provide a web server with access to these chunks. The viewer device can then transmit HTTP requests to the web server via a content delivery network, and acquire the chunks via the content delivery network sequentially based on the file according to, for example, the HTTP live streaming (HLS) protocol.

Figure 5:
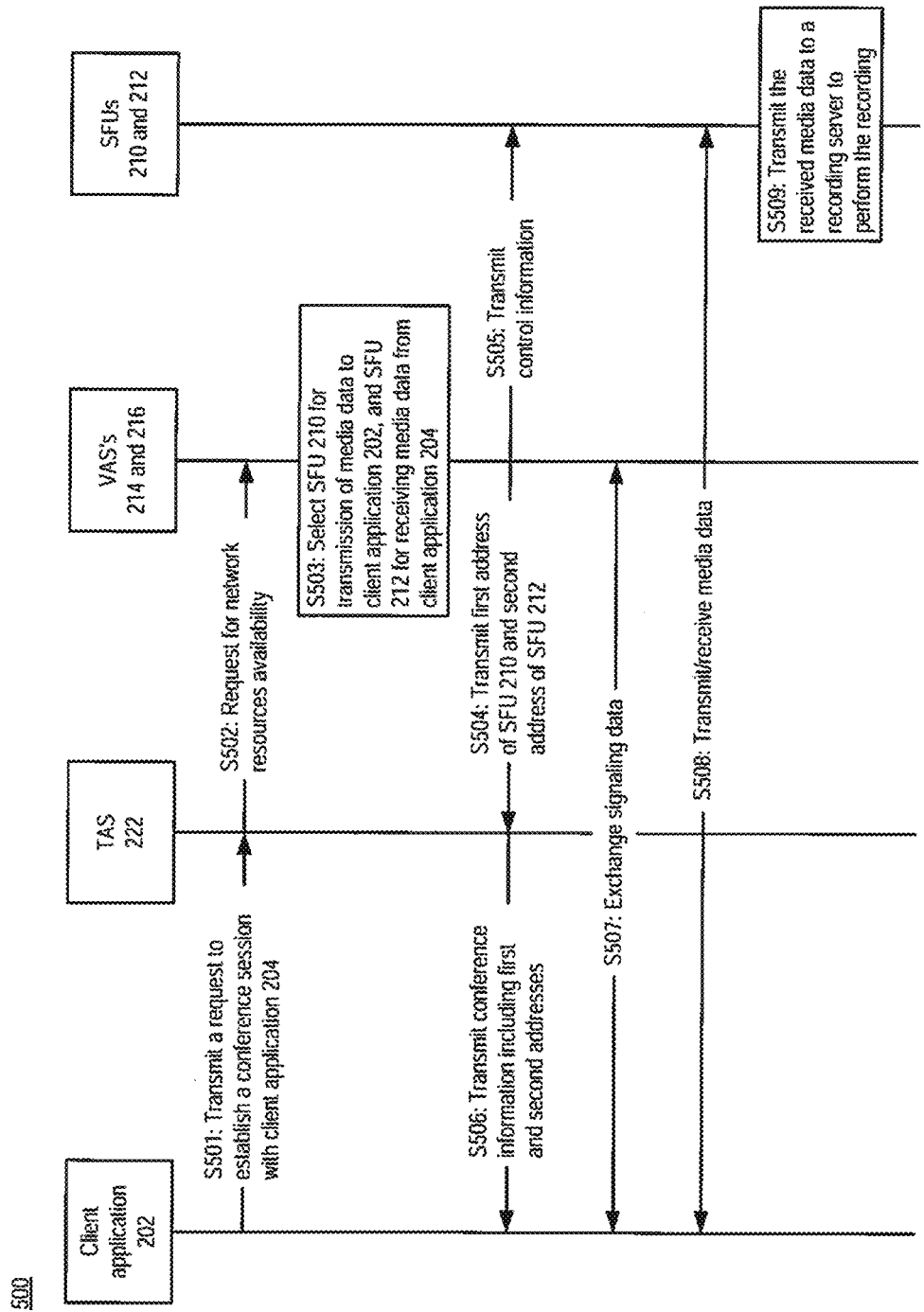
FIG. 5 is a data flow graph used to explain an example of a method for conducting a conference session, consistent with disclosed embodiments.

FIG. 5 is a data flow diagram used to explain an example of a method for conducting a conference session, consistent with disclosed embodiments. The steps associated with this example process can be performed by the components of, for example, FIG. 2. In the following description, reference is made to certain components of FIG. 2 for purposes of illustration. It will be appreciated, however, that other implementations are possible and that components other than that illustrated in FIG. 2 can be utilized to implement the example method of FIG. 5. Moreover, while the chart discloses the following steps in a particular order, it will be appreciated that at least some of the steps can be moved, modified, or deleted where appropriate, consistent with the teachings of the present disclosure.

Method 500 begins with step S501, in which conference client application 202 transmits a request (e.g., conference session request 240) to telco application server 222 to establish a conference session with conference client application 204. The request may include, for example, an identifier of conference client application 202, access information of the conference session (e.g., a list of IP and/or MAC addresses of participant user devices with permission to join the conference session), and configuration information of the conference session (e.g., requested media quality of the conference session, the media processing capabilities requested for the conference session, the display screen resolution of the participant device on which conference client application 202 operates, etc.).

After receiving the request, telco application server 222 can transmit requests to predetermined video application servers for network resources availability, in step S502. The video application servers can be determined based on, for example, the locale in which conference client application 202 is located, the requested media quality and/or media processing capabilities requested for the conference session, etc., all of which can be determined based on information included in the request. In the illustrative example shown in FIG. 5 (as in FIG. 2), telco application server 222 determines to request network resources for the conference session from video application servers 214 and 216.

After receiving the request for network resources availability, video application server 214 may select selective forwarding unit 210 for conference client application 202 to transmit media data to client application 202, and video application server 216 may select selective forwarding unit 212 for conference client application 202 to receive media data from conference client application 204, in step S503. The selective forwarding units can be selected based on, for example, a determination that these selective forwarding units can provide the requested media quality and media processing capabilities. Video application servers 214 and 216 can also forward a first address associated with selective forwarding unit 210 and a second address associated with selective forwarding unit 212 to telco application server 222, in step S504. Video application servers 214 and 216 also transmit control information (e.g., control data 218 and 220) to selective forwarding units 210 and 212, in step S505. The control information may include, for example, instructions to reserve processing resources for the conference session, list of IP and/or MAC addresses of participant user devices, resolution of video data to be forwarded to the conference client applications, etc.

Telco application server 222 can then transmit conference information to the client application 202 including the indications that conference client application 202 is to transmit media data to the first address and to receive media data from conference client application 204 via the second address, in step S506. After receiving the conference information, conference client application 202 can then exchange signaling data with video application servers 214 and 216, in step S507, to establish connections between each of selective forwarding units 210 and 212 and conference client application 202. Conference client application 202 can then transmit media data to selective forwarding unit 210 and receive media data from selective forwarding unit 212, in step S508.

In some embodiments, the request transmitted in step S501 also includes a request to create a recording of the conference session, as well as the type of recording (e.g., whether to record it as a single video file, a package, etc.). Telco application server 222 can forward the recording information to video application servers 214 and 216 as a part of the request for network resources availability (transmitted in step S502). Video application servers 214 and 216 can then transmit the recording information to selective forwarding units 210 and 212 in the control information (transmitted in step S505). After receiving the media data from conference client applications 202 and 204, selective forwarding units 210 and 212 can forward the media data to one or more recording servers to perform the recording, in step S509.

In some embodiments, recording server 406 can create recording 410, and determine the type of recording (e.g., a single video file, a package, etc.) based on a user input received by conference client application 202, which can then transmit an instruction to generate recording 410, as well as the type of recording, to telco application server 222. The recording instruction can be transmitted as a part of the request to establish the conference session. Telco application server 222 can then forward the recording instruction to video application servers 214 and 216, which can then control, respectively, selective forwarding units 210 and 212, as well as recording server 406, to perform the recording. For example, in a case where a single video file is to be recorded, selective forwarding units 210 and 212 can be controlled to store the media data packets that have been selectively forwarded to conference client applications 202 and 204 at temporary storages 402 and 404. Also, in a case where a package is to be recorded, selective forwarding units 210 and 212 can be controlled to store the media data packets received from client applications 204 and 204, which can include multiple video streams of different video resolutions, at temporary storages 402 and 404.

Figure 6:
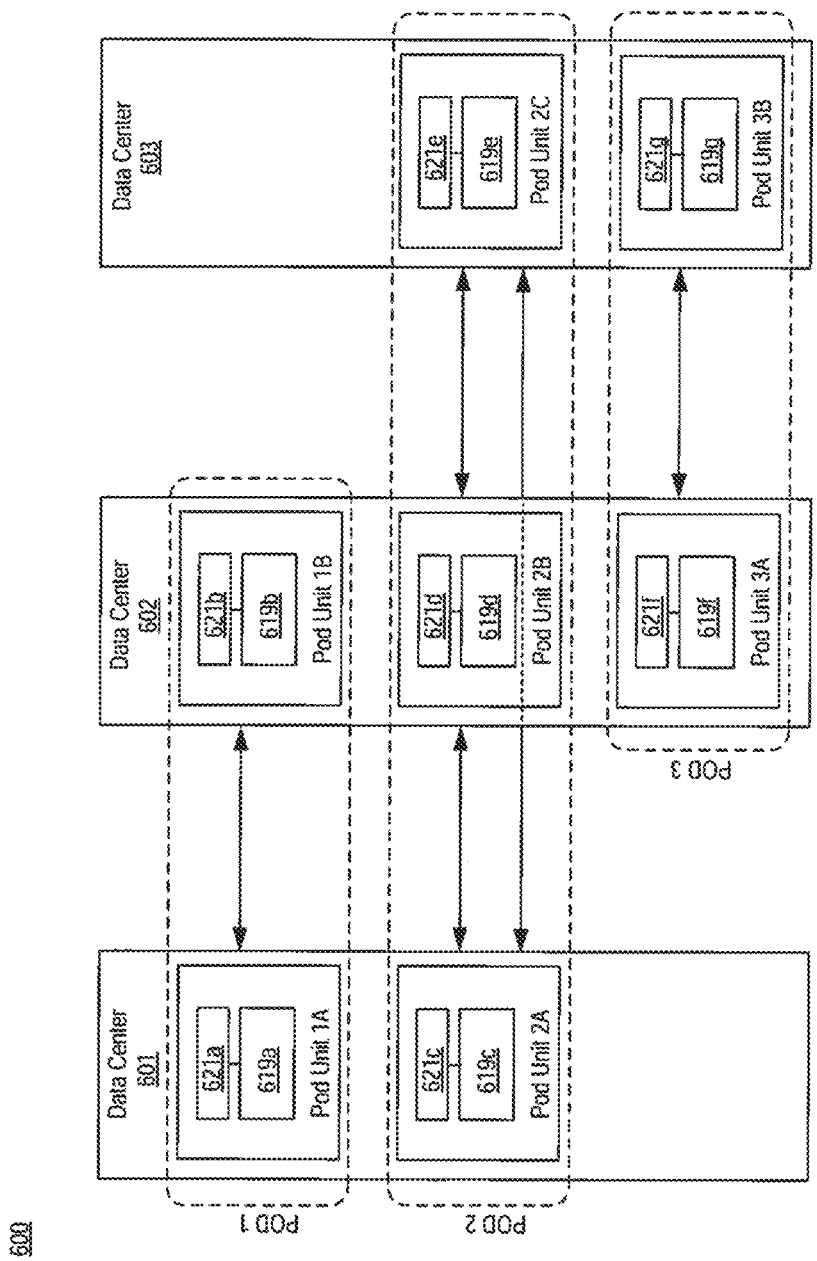
FIGS. 6 and 7 are component diagrams of an example of a communication system in which various implementations described herein may be practiced, consistent with disclosed embodiments.

FIG. 6 is a component diagram of an example of a communication system 600 in which various implementations described herein may be practiced, consistent with disclosed embodiments. Communication system 600 can be, for example, a telephony system such as a hosted Private Branch Exchange (PBX) platform that provides voice and video over IP, fax services, etc. Communication system 600 includes data centers 601, 602, and 603. Each data center is a point of presence (POP) that includes the network computing resources (e.g., servers, routers, switches, network connections, storage devices, etc.) for supporting the services provided by communication system 600. Each data center is typically located in a different geographical region.

In the depicted example, communication system 600 includes three user points of data (pods), i.e., pods 1, 2, and 3, each of which is a logical grouping of two or more pod units situated in different data centers. Each pod serves a different subset of user accounts. In this example, each pod unit (e.g., Pod Unit 2A) serves the same subset of users as the other pod units within the same pod (e.g., Pod Units 2B and 2C). Each pod unit includes a communication server 619a-619g configured to provide substantially the same services to the same subset of users as the other pod units within the same pod. Each pod unit also includes an account database 621a-621g configured to support the respective communication servers for the corresponding subset of users.

In some examples, components of communication system 600 can be used to implement computer programs, applications, methods, processes, or other software to perform the above-described techniques and to realize the structures described herein. For example, communication server 619a-619g can be used to implement the functionalities of, for example, video application servers 214 and 216, as well as selective forwarding units 210 and 212 of FIG. 2. Moreover, account database 621a-621g can be used to provide account information of users for establishing a conference session, which may include, for example, location of a participant user device, the media quality a user has subscribed, etc.

Figure 7:
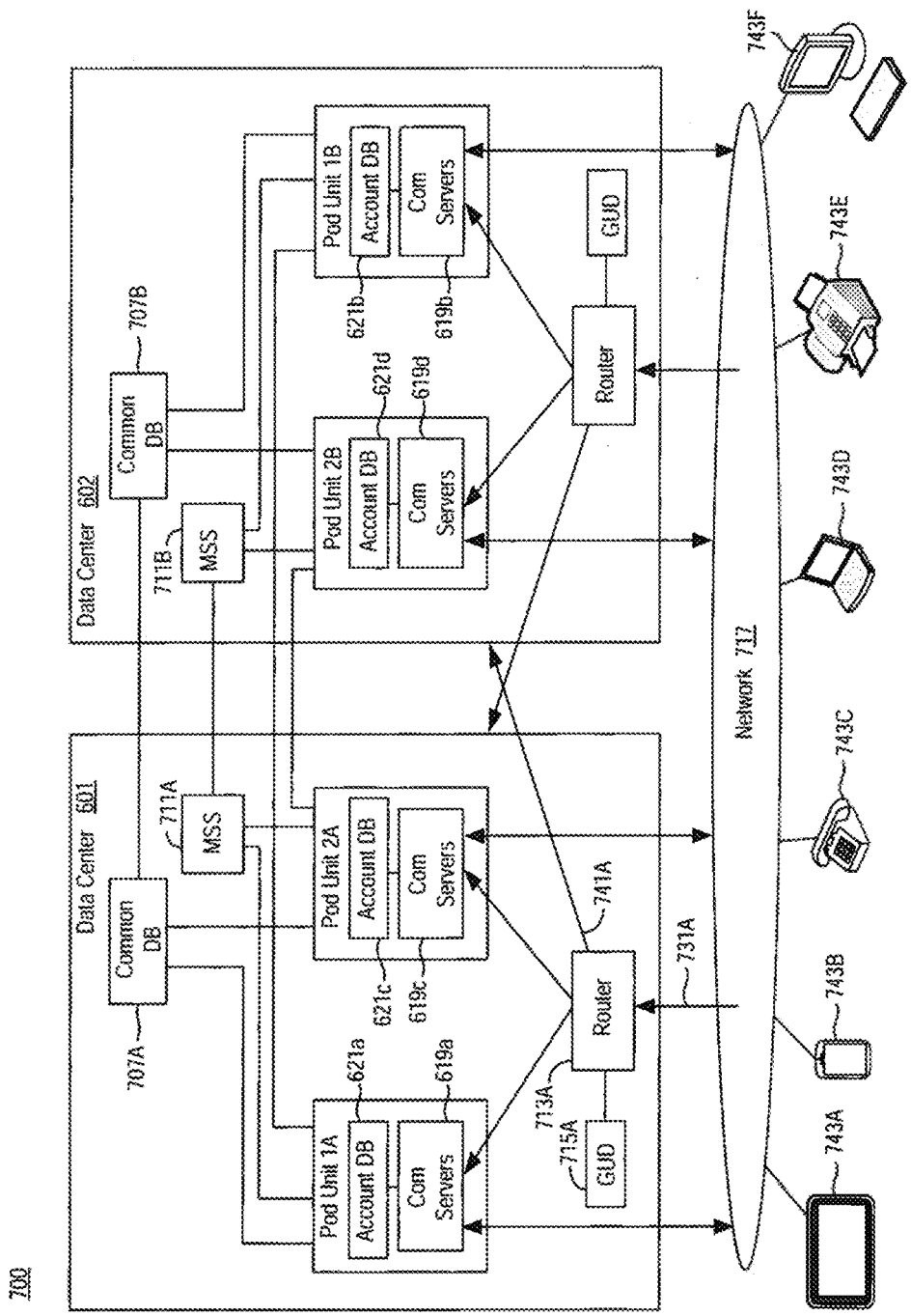

FIG. 7 is a component diagram of an example of a communication system 700 in which various implementations described herein may be practiced, consistent with disclosed embodiments. Specifically, FIG. 7 shows the various interconnections within and between data centers 601 and 602 of FIG. 7. Both data centers are in communication with network 717. Service requests from various communication devices 743A-743F are routed through network 717 to either or both of the data centers. Devices 743A-743F represent a diversity of client devices that connect with a services system designed in accordance with one or more implementations as described herein. Such client devices include, for example (and without limitation), cell phones, smart phones, tablets, laptop and desktop computers, conventional telephones, IP phones, teleconferencing devices, videoconferencing devices, set top boxes, gaming consoles, wearable computing devices, smartwatches, etc. Reference to specific client device types should therefore not be used to limit the scope of the present disclosure. In some examples, devices 743A-743F may represent user devices 110, 120, 130, and 140 depicted in FIG. 1A.

Data center 601 includes pod units 1A and 2A, a common database (Common DB) 707A, a message storage system (MSS) 711A, a router 713A, and a global user directory (GUD) 715k Additional pod units (not shown) may also be included in data center 601. Data center 602 is similarly configured and includes components that operate substantially the same as those in data center 601. Data centers 601 and 602 may provide backup and redundancy to one another in the event of failure.

Communication servers 619a-619c provide telecommunication services (e.g., voice, video, email, and/or facsimile) to corresponding subsets of users. Communication servers 619a-619c may include, for example, video application servers 214 and 216, selective forwarding units 210 and 212, as well as media servers configured to provide media processing (e.g., transcoding, merging data streams, etc.) for a conference session, etc. Each server 619a-619c may also provide other services including, for example, user account management and configuration, billing services, accounting services, etc. Each pod unit includes an account databases (Account DB) 621a-621c to support the communication server(s) for that particular pod unit, storing configuration details and other information regarding each user's account.

Pod Units 1A and 1B are in communication with one another so that the data on their respective account databases 621a-621c are synchronized across data centers. Data center 601 includes router 713A to receive an incoming service request 731A from network 717. The incoming service request may include, for example, a request to establish a conference session, a request to adjust the display resolutions for various windows on a conference client interface, a request to record a conference session, etc. Router 713A parses the incoming service request to identify or extract a user key and queries GUD 715A to determine which pod is associated with the user key. Router 713A also routes the service request to the pod unit in the data center associated with the identified pod. If, for example, the pod unit associated with the identified pod is not associated with data center 601, router 713A routes the service request to another data center (e.g., data center 602 as indicated by the arrow 741A).

Each pod unit of the data center 601 is also coupled to MSS 711A which stores files for the users served by Pod Units 1A and 2A. These files may include, for example, messages (e.g., voicemails and facsimiles), user logs, system messages, system and user call prompts (e.g., auto-attendant or user-recorded greetings), and other types of call-related or electronic messages. These files may also include recording of the conference session. The contents of MSS 711A may be synchronized or combined with other data centers.

Each Pod Unit in data center 601 is coupled to common database 707A which stores shared data for all of the pods, and stores consolidated information from account databases 621a-621c. Common database 707A also facilitates changes to the pod databases. For example, common database 707A may store data for applications that provide the services on communication servers 619a-619c. Different versions of the applications data may be stored in common database 707A, allowing changes and upgrades to communication servers 619a-619c to be implemented efficiently and conveniently. Changes may be made to common database 707A and propagated to Pod Units 1A and 2A. Common database 707A is synchronized across data centers to other common databases (e.g., common database 707B of data center 602). Common database 707A, MSS 711A, router 713A, and GUD 715A form a common layer of resources that are shared by all pod units in data center 601.

Figure 8:
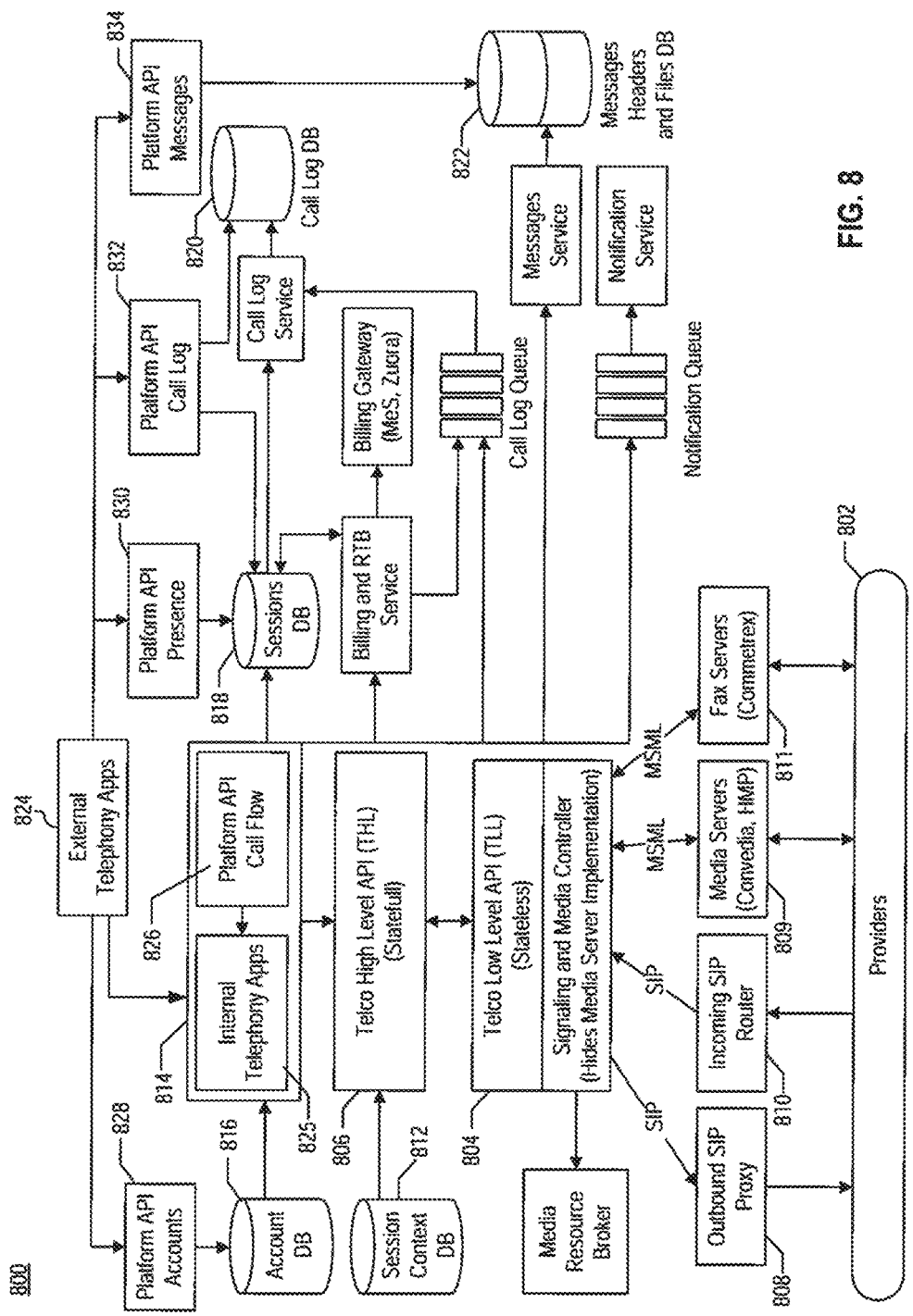
FIG. 8 is a component diagram of an example of a Private Branch Exchange (PBX) platform in which various implementations described herein may be practiced, consistent with disclosed embodiments.

FIG. 8 is a component diagram of an example of a Private Branch Exchange (PBX) platform in which various implementations described herein (e.g., communication systems 600 and 700 of FIGS. 6 and 7) may be practiced, consistent with disclosed embodiments. FIG. 8 depicts a PBX platform 800, which provides telephony services that allow communication among its users, and between its users and users associated with a variety of external telephony providers 802 via telecommunication APIs 804 and 806, outbound SIP proxy 808, and incoming SIP router 810. Media servers 809 and fax servers 811 provide functionality for processing voice over IP and fax over IP data, respectively. Telco low level API 804 is a stateless low-level API that provides signaling and media telephony primitives including, for example, call answering, placing of outbound calls, creation of conference call objects, addition of calls to conference call objects, playback of media for active calls, recording of active calls, etc. Telco high level API 806 is a higher-level API that has more sophisticated functionality such as, for example, interactive voice response (IVR), call forwarding, voice mail, etc. In the depicted implementation, telco API high level 806 doesn't have access to the PBX platforms databases, but maintains session context data of session context DB 812 to support its functionality. Telco high level API 806 may include function primitives which can be used to support the development of telephony applications. In some embodiments, telecommunication APIs 804 and 806 may provide at least some functionalities of telco application server 222 of FIG. 2.

Outbound SIP proxy 808 and incoming SIP router 810 employ SIP. SIP can be used for creating, modifying and terminating two-party (unicast) or multiparty (multicast) sessions, and may be one of the core protocols employed by systems configured as shown in and described above with reference to FIGS. 6 and 7. In some embodiments, outbound SIP proxy 808 and incoming SIP router 810 are used for transmitting signaling data with a conference client application.

The core functionality of PBX platform 800 (e.g., as described above with reference to FIGS. 6 and 7) is accessed via telephony services block 814 which has access (not entirely shown for clarity) to the various data repositories of PBX platform 800, e.g., account database (DB) 816, sessions DB 818, call log DB 820 and messages headers and files DB 822. Telephony services block 814 receives commands from telephony applications 824 and controls execution of the commands on the PBX platform 800. Telephony services block 814 can also include internal telephony applications 825 that are hosted and/or developed on or in connection with PBX platform 800. The depicted implementation also includes various APIs that allow external telephony applications 824 to interact with PBX platform 800. The APIs associated with PBX platform 800 allow telephony applications 824 and 825 to integrate with basic functionality of PBX platform 800 at multiple integration points, to control call flows during execution of the call flows by the platform (e.g., via API 826), and to access platform data (e.g., in DBs 816-822 via APIs 828-834).

Figure 9:
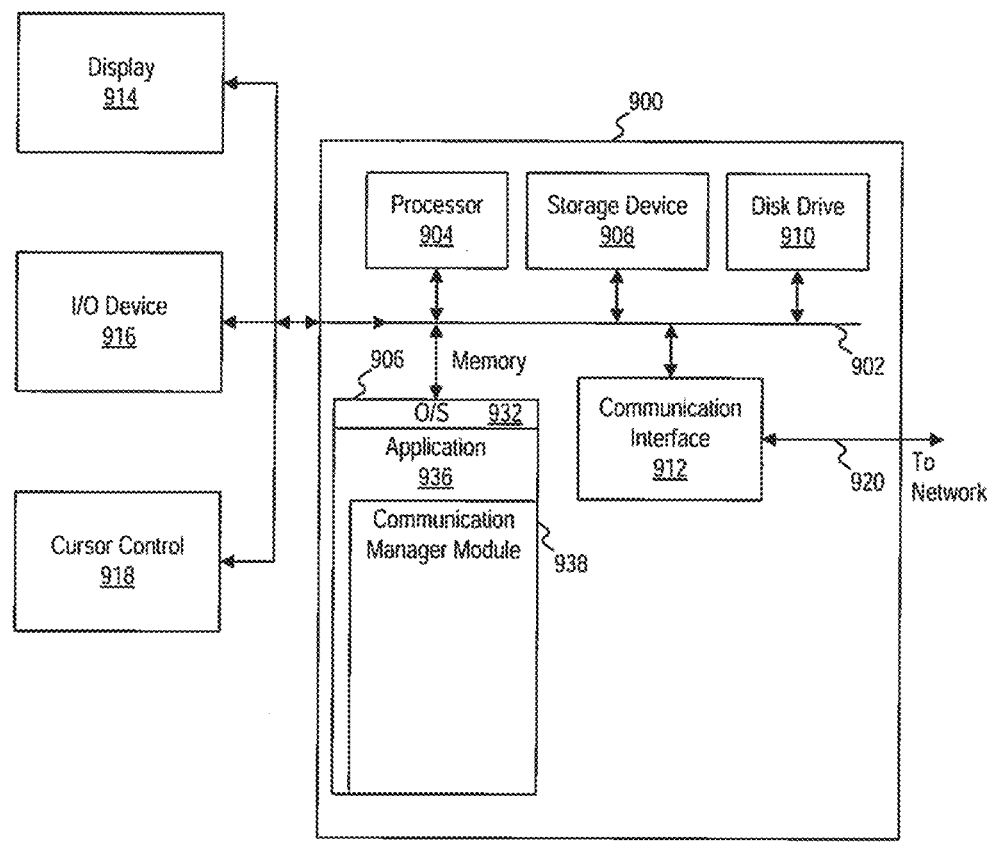
FIG. 9 is a component diagram of an example of a computer system with which embodiments described herein can be implemented, consistent with disclosed embodiments.

FIG. 9 is a component diagram of an example of a computer system with which embodiments described herein can be implemented, consistent with disclosed embodiments. FIG. 9 depicts a computer system 900. In some examples, computer system 900 can be used to implement computer programs, applications, methods, processes, or other software to perform the above-described techniques and to realize the structures described herein, such as user devices 110, 120, 130, and 140, telco application server 222, video application servers 214 and 216, selective forwarding units 210 and 212, and recording server 406.

As shown in FIG. 9, computer system 900 includes a bus 902 or other communication mechanism for communicating information, which interconnects subsystems and devices, such as one or more processors 904, system memory ("memory") 906, storage device 908 (e.g., ROM), disk drive 910 (e.g., magnetic or optical), communication interface 912 (e.g., a modem, Ethernet card, or any other interface configured to exchange data with a communications network), display 914 (e.g., CRT or LCD), input device 916 (e.g., keyboard), and pointer cursor control 918 (e.g., mouse or trackball).

According to some examples, computer system 900 performs specific operations in which processor 904 executes one or more sequences of one or more instructions stored in system memory 906. Such instructions can be read into system memory 906 from another computer readable medium, such as static storage device 908 or disk drive 910. In some examples, hard-wired circuitry can be used in place of or in combination with software instructions for implementation. In the example shown, system memory 906 includes modules of executable instructions for implementing an operation system ("O/S") 932, an application 936, and a communication manager module 938, which can provide the functionalities disclosed herein. Application 936 may include, for example, packing processing module 175 of FIG. 1B, conference client applications 202 and 204 of FIG. 2, etc.

In some examples, execution of the sequences of instructions can be performed by a single computer system 900. According to some examples, two or more computer systems 900 coupled by communication link 920 (e.g., links to LAN, PSTN, or wireless network) can perform the sequence of instructions in coordination with one another. Computer system 900 can transmit and receive messages, data, and instructions, including program code (i.e., application code) through communication link 920 and communication interface 912. Received program code can be executed by processor 904 as it is received, and stored in disk drive 910, or other non-volatile storage for later execution.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A method of establishing a video conference session, the method comprising:
   receiving, from a first conference client device, a request to establish a conference session with a second conference client device, wherein the request includes a display configuration that selects a resolution of displaying media data received from the second conference client device;
   determining a first media router for forwarding, to the second conference client device, a media data stream with predetermined attributes of a plurality of first media data streams generated by the first conference client device;
   determining a second media router for forwarding, to the first conference client, a media data stream with predetermined media attributes of a plurality of second media data streams generated by the second conference client device, wherein the plurality of second media data streams includes a first video data stream associated with a first resolution and a second video data stream associated with a second resolution;
   transmitting, to the first conference client device, a first address associated with the first media router and a second address associated with the second media router, to enable the first conference client device to transmit the plurality of first media data streams to the first media router and to receive the media data stream with predetermined media attributes of the plurality of second media data streams from the second media router; and
   transmitting data related to the display configuration to the second media router to cause the second media router to forward the video data streams at the selected resolution to the first conference client device.

2. The method of claim 1, wherein at least one of the first and second media routers is determined based on available processing bandwidth.

3. The method of claim 1, wherein the first media router is determined based on a location of the first conference client device.

4. The method of claim 1, further comprising:
   transmitting a first instruction to one or more recording servers to cause the one or more recording servers to record at least a part of the plurality of first media data streams and at least a part of the plurality of second media data streams.

5. The method of claim 4, wherein the request includes a recording configuration for recording the conference session at a predetermined quality;
   wherein the method further comprises:
   transmitting data related to the recording configuration to the first and second media routers to cause the first and second media routers to transmit, respectively, a first media data stream with the predetermined quality of the plurality of first media data streams and a second media data stream with the predetermined quality of the plurality of second media data streams to a single recording server of the one or more recording servers;
   wherein the instruction causes the single recording server to generate a single file based on the first and second media data streams.

6. The method of claim 5, wherein the single file comprises a single video file.

7. The method of claim 5, wherein the single file comprises audio and video tracks associated with the first and second conference client devices.

8. The method of claim 4, wherein the request includes a recording configuration for selectively recording at least a part of the plurality of first media data streams during a first predetermined period of the conference session and at least a part of the plurality of second media data streams a during a second predetermined period of the conference session;
   wherein the method further comprises:
   transmitting data related to the recording configuration to the one or more recording servers, to cause the one or more recording servers to generate a meta information file that links a first file that stores the selectively recorded at least a part of the plurality of first media data streams and a second file that stores the selectively recorded at least a part of the plurality of second media data streams.

9. The method of claim 4, further comprising:
receiving, from a viewer device, a request for media data of the conference session; and
transmitting a second instruction to the one or more recording servers to cause the one or more recording servers to provide the recorded at least a part of the plurality of first media data streams and the recorded at least a part of the plurality of second media data streams to the third video client via a content delivery network.

10. The method of claim 9, wherein the second instruction causes the one or more recording servers to establish a connection under the Real-Time Messaging Protocol (RTMP), and to transmit the recorded at least a part of the plurality of first media data streams and the plurality of second media data streams to the viewer device at predetermined time intervals over the connection.

11. The method of claim 9, wherein the second instruction causes the one or more recording servers to store the recorded at least a part of the plurality of first media data streams and the plurality of second media data streams at a database accessible to a web server that provides streaming under Hypertext Transfer Protocol Live Streaming (HLS) protocol to the viewer device.

12. A system for establishing a video conference session, the system comprising:
one or more memories having stored thereon computer-executable instructions; and
one or more hardware processors configured to execute the stored instructions to:
receive, from a first conference client device, a request to establish a conference session with a second conference client device, wherein the request includes a recording configuration for recording conference session at a predetermined quality;
determine a first media router for forwarding, to the second conference client device, a media data stream with predetermined attributes of a plurality of first media data streams generated by the first conference client device;
determine a second media router for forwarding, to the first conference client, a media data stream with predetermined media attributes of a plurality of second media data streams generated by the second conference client device;
transmit, to the first conference client device, a first address associated with the first media router and a second address associated with the second media router, to enable the first conference client device to transmit the plurality of first media data streams to the first media router and to receive the media data stream with predetermined media attributes of the plurality of second media data streams from the second media router;
transmit a first instruction to one or more recording servers to cause the one or more recording servers to record at least a part of the plurality of first media data streams and at least a part of the plurality of second media data streams; and
transmit data related to the recording configuration to the first and second media routers to cause the first and second media routers to transmit, respectively, a first media data stream with the predetermined quality of the plurality of first media data streams and a second media data stream with the predetermined quality of the plurality of second media data streams to a single recording server of the one or more recording servers, wherein the first instruction causes the single recording server to generate a single file based on the first and second media data streams.

13. The system of claim 12, wherein the first media router is determined based on at least one of: available processing bandwidth, and a location of the first conference client device.

14. The system of claim 12, wherein the plurality of second media data streams includes a first video data stream associated with a first resolution and a second video data stream associated with a second resolution;
wherein the request includes a display configuration that selects the second resolution for displaying media data received from the second conference client device;
wherein the hardware processor is configured to execute the stored instructions to:
transmit data related to the display configuration to the second media router to cause the second media router to forward the second video data stream to the first conference client device.

15. The method of claim 12, wherein the single file comprises a single video file, or a set of audio and video tracks associated with the first and second conference client devices.

16. A non-transitory computer-readable medium storing instructions that are executable by one or more processors to cause the one or more processors to perform a method for establishing a video conference session, the method comprising:
receiving, from a first conference client device, a request to establish a conference session with a second conference client device;
determining a first media router for forwarding, to the second conference client device, a media data stream with predetermined attributes of a plurality of first media data streams generated by the first conference client device;
determining a second media router for forwarding, to the first conference client, a media data stream with predetermined media attributes of a plurality of second media data streams generated by the second conference client device; and
transmitting, to the first conference client device, a first address associated with the first media router and a second address associated with the second media router, to enable the first conference client device to transmit the plurality of first media data streams to the first media router and to receive the media data stream with predetermined media attributes of the plurality of second media data streams from the second media router;
transmitting a first instruction to one or more recording servers to cause the one or more recording servers to record at least a part of the plurality of first media data streams and at least a part of the plurality of second media data streams; and
transmitting data related to a recording configuration to the first and second media routers to cause the first and second media routers to transmit, respectively, a first media data stream with the predetermined quality of the plurality of first media data streams and a second media data stream with the predetermined quality of the plurality of second media data streams to a single recording server of the one or more recording servers wherein the instruction causes the single recording server to generate a single file based on the first and second media data streams.

17. The non-transitory computer-readable medium of claim 16, wherein the single file comprises a single video file.

18. The non-transitory computer-readable medium of claim 16, wherein the single file comprises audio and video tracks associated with the first and second conference client devices.

19. The non-transitory computer-readable medium of claim 16, wherein the request includes a recording configuration for selectively recording at least a part of the plurality of first media data streams during a first predetermined period of the conference session and at least a part of the plurality of second media data streams a during a second predetermined period of the conference session, and the method further comprises:
   transmitting data related to the recording configuration to the one or more recording servers, to cause the one or more recording servers to generate a meta information file that links a first file that stores the selectively recorded at least a part of the plurality of first media data streams and a second file that stores the selectively recorded at least a part of the plurality of second media data streams.

20. The non-transitory computer-readable medium of claim 16, wherein the method further comprises:
   receiving, from a viewer device, a request for media data of the conference session; and
   transmitting a second instruction to the one or more recording servers to cause the one or more recording servers to provide the recorded at least a part of the plurality of first media data streams and the recorded at least a part of the plurality of second media data streams to the third video client via a content delivery network.

* * * * *